(12) United States Patent
Munk (10) Patent No.: US 10,288,124 B2
(45) Date of Patent: May 14, 2019

(54) COUPLING HAVING AN INPUT-SIDE COUPLING PART AND AN OUTPUT-SIDE COUPLING PART

(71) Applicant: GRUNDFOS HOLDING A/S, Bjerringbro (DK)

(72) Inventor: Flemming Munk, Viborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 14/913,796

(22) PCT Filed: Jun. 10, 2014

(86) PCT No.: PCT/EP2014/062010
§ 371 (c)(1),
(2) Date: Feb. 23, 2016

(87) PCT Pub. No.: WO2015/028164
PCT Pub. Date: Mar. 5, 2015

(65) Prior Publication Data
US 2016/0245343 A1  Aug. 25, 2016

(30) Foreign Application Priority Data
Aug. 26, 2013 (EP) .................................. 13181679

(51) Int. Cl.
*F16D 3/10* (2006.01)

(52) U.S. Cl.
CPC ............. *F16D 3/10* (2013.01); *Y10T 464/20* (2015.01)

(58) Field of Classification Search
CPC ................................ Y10T 464/20; F16D 3/10

USPC ........................ 464/23, 76; 700/279; 73/462; 324/207.11, 207.25
See application file for complete search history.

(56) References Cited

U.S. PATENT DOCUMENTS

| | | | | |
|---|---|---|---|---|
| 1,798,523 A | * | 3/1931 | Crowell | E21B 3/04 464/23 |
| 5,372,548 A | * | 12/1994 | Wohlfeld | E21B 17/073 464/76 |
| 6,434,849 B1 | * | 8/2002 | Hermann | G01B 21/24 33/286 |
| 6,606,922 B2 | * | 8/2003 | Case | F16F 15/36 700/279 |

(Continued)

FOREIGN PATENT DOCUMENTS

| EP | 1 775 492 A1 | 4/2007 |
|---|---|---|
| WO | 2007/052504 A1 | 5/2007 |
| WO | 2012/002901 A2 | 1/2012 |

*Primary Examiner* — Greg Binda
(74) *Attorney, Agent, or Firm* — McGlew and Tuttle, P.C.

(57) ABSTRACT

A coupling has an input-side coupling part (1) and an output-side coupling part (2), which are connected to each other in a torque-transmitting manner in such a way that the coupling parts can be moved to a limited extent. The output-side coupling part (2) has a rod-shaped body (10) rigidly connected to the output-side coupling part, which rod-shaped body extends in the direction of the axis of rotation (9) of the coupling and is surrounded by a hollow body (5) rigidly connected to the other coupling part (1). Sensor elements (11, 12) are provided, by which the radial distance between the rod-shaped body (10) and the hollow body (5) is detected during the rotation of the coupling.

16 Claims, 5 Drawing Sheets

(56) References Cited

U.S. PATENT DOCUMENTS

| | | | | |
|---|---|---|---|---|
| 7,307,415 B2* | 12/2007 | Seger | ............... | G01D 5/04 |
| | | | | 324/207.25 |
| 7,891,461 B2* | 2/2011 | Miyoshi | ............... | B62D 5/0409 |
| | | | | 324/207.25 |
| 9,976,601 B2* | 5/2018 | Lysen | ............... | G01B 21/24 |
| 2013/0154625 A1 | 6/2013 | Choi et al. | | |

\* cited by examiner

COUPLING HAVING AN INPUT-SIDE COUPLING PART AND AN OUTPUT-SIDE COUPLING PART

CROSS REFERENCE TO RELATED APPLICATIONS

This application is a U.S. National Phase Application of International Application PCT/EP2014/062010 filed Jun. 10, 2014 and claims the benefit of priority under 35 U.S.C. § 119 of European Patent Application 13 181 679.5 filed Aug. 26, 2013 the entire contents of which are incorporated herein by reference.

FIELD OF THE INVENTION

The present invention a coupling with a drive-side coupling part and with a driven-side coupling part, which are connected to one another in a limitedly movable and torque-transmitting manner.

BACKGROUND OF THE INVENTION

In machines with rotary drive, it is important that the drive-side shaft aligns as precisely as possible with the driven-side shaft, i.e., that their rotation axes ideally coincide. However, this is practically never achieved in practice. Alignment errors can arise, whether in the form of displacement, i.e., the rotation axes are parallel, but do not correspond, or angular displacement, i.e., the rotation axes are angled relative to each other (angular error). In practice, both errors are most often encountered in combination. The goal is to minimize the latter to thereby keep the radial and axial forces they induce in the bearings as small as possible, so as to protect bearings, gaskets and couplings.

In practice, alignment between the drive shaft of the motor and drive shaft of a machine takes place with the machine standing idle, even though this is disadvantageous for system-related reasons. The machine is only exposed to static influences when standing idle, but during operation is subject to dynamic influences, which can be many times higher. In addition, cracked bearings are positioned differently during operation than when standing idle.

SUMMARY OF THE INVENTION

Against this backdrop, an object of the invention is to design a generic coupling in such a way that angular and/or displacement errors between the drive and output can be acquired during operation. The coupling is here to be designed in such a way that it can be easily incorporated between the drive and output.

The coupling according to the invention exhibits a drive-side coupling part and a driven-side coupling part, which are connected to one another in a limitedly movable and torque-transmitting manner. In the invention, a coupling part is fixedly connected to a rod body (rod-shape or rod-like), which extends in the direction of the rotation axis of the coupling, and is surrounded by a hollow body fixedly connected to the other coupling part, wherein sensor means are provided, with which the radial distance between the rod-like body and hollow body can be detected during rotation of the coupling.

The underlying idea of the coupling according to the invention has to do with providing two coupling parts, which are arranged in a limitedly movable manner relative to each other in such a way that they can have both displacement and angular errors, but still transmit the torque between the drive side and driven side. These two coupling parts have allocated to them a respective component that extends essentially in the direction of the rotation axis or parallel thereto, and is fixedly connected with the respective coupling part. Sensor means are here provided between these components, and detect the distance between the latter, in particular their radial distance from each other, during operation, and in this way can also detect displacement or angular errors during operation that change as a function of the rotation angle.

In terms of the invention, hollow bodies are to be understood as any body that envelops the rod-like body at two or more locations. In this sense, a hollow body can also be a forked body, for example, between whose prongs the tubular body is arranged.

With the machine in operation, i.e., even in a loaded state, the coupling according to the invention makes it possible to ascertain displacement and angular errors between the drive and output. The coupling according to the invention can serve as a separate component for aligning machine parts relative to each other, or to acquire the positional change of the drive and drive shafts relative to each other in operation, but also be an inherent part of a machine, so as to monitor angular errors and/or displacement during operation.

In order to be able to detect both angular errors and displacement errors simultaneously, a further development of the invention advantageously provides sensor means on at least two locations spaced axially apart, which detect the radial distance between the rod-like body and hollow body.

In order to be able to differentiate between angular and displacement errors in particular, it is advantageous for the sensor means to exhibit two groups of distance sensors spaced apart from each other, which detect the distance between the hollow body and rod-like body.

In a further development of the invention, it is especially advantageous if a group of distance sensors exhibits at least two distance sensors preferably offset to each other by 90° in relation to the rotation axis, with which the distance between the hollow body and rod-like body is constantly detected as the coupling rotates, making it possible to determine both displacement and angular errors as a function of rotation angle. An especially high accuracy of measuring results is achieved if each group of distance sensors exhibits three or more distance sensors preferably distributed around the rotation axis at an identical angular distance.

Eddy current sensors can advantageously be used as the distance sensors, wherein the body to be detected must then be electrically conductive. The sensors can here either be situated on the rod-like body, or more preferably inside the hollow body, so as to acquire the distance between the hollow body or sensor and the rod-like body. Such distance sensors are insensitive to media in the measuring gap, for example dust, oil, water or the like. They measure the distance in a contactless manner, and output a stable signal, which is electronically simple to evaluate.

Signal processing and evaluation can here take place either inside the coupling or stationarily outside. In a further development of the invention, a preferably microprocessor-based electronic evaluation unit is advantageously provided inside the coupling, acquires and evaluates the sensor signals, and detects any radial displacement and/or angular displacement (angular error) between the coupling parts. Of course, this displacement can be ascertained as a function of rotation angle, and corresponding storage means can be provided, so that a chronologically continuous or intermittent acquisition can also be evaluated and recorded.

When deciding against such an electronic evaluation unit inside the coupling, it is advantageous to provide means for wirelessly transmitting the signals output by the distance sensors. In the case of eddy current sensors, this can advantageously be done via analog signal transmission, which minimizes the electronic outlay required in the coupling.

If the electronic evaluation unit is situated inside the coupling, it makes sense to provide means for outgoing wireless transmission from the electronic evaluation unit, preferably to a stationary or mobile receiver. Such a data transmission preferably takes place digitally. The data can here be continuously transmitted or buffered in memory and sent in chronological intervals. For purposes of power supply, the coupling advantageously incorporates an electrical power supply unit, typically a battery or accumulator. Such a power supply unit will advantageously be provided in the coupling part where the sensors are arranged. The electrical power supply unit can here consist of an energy store, for example a battery or accumulator, or also, if necessary additionally, of a generator or inductive power supply.

The invention will be explained in greater detail below based on an exemplary embodiment depicted in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

DESCRIPTION OF THE PREFERRED EMBODIMENTS

Figure 1:
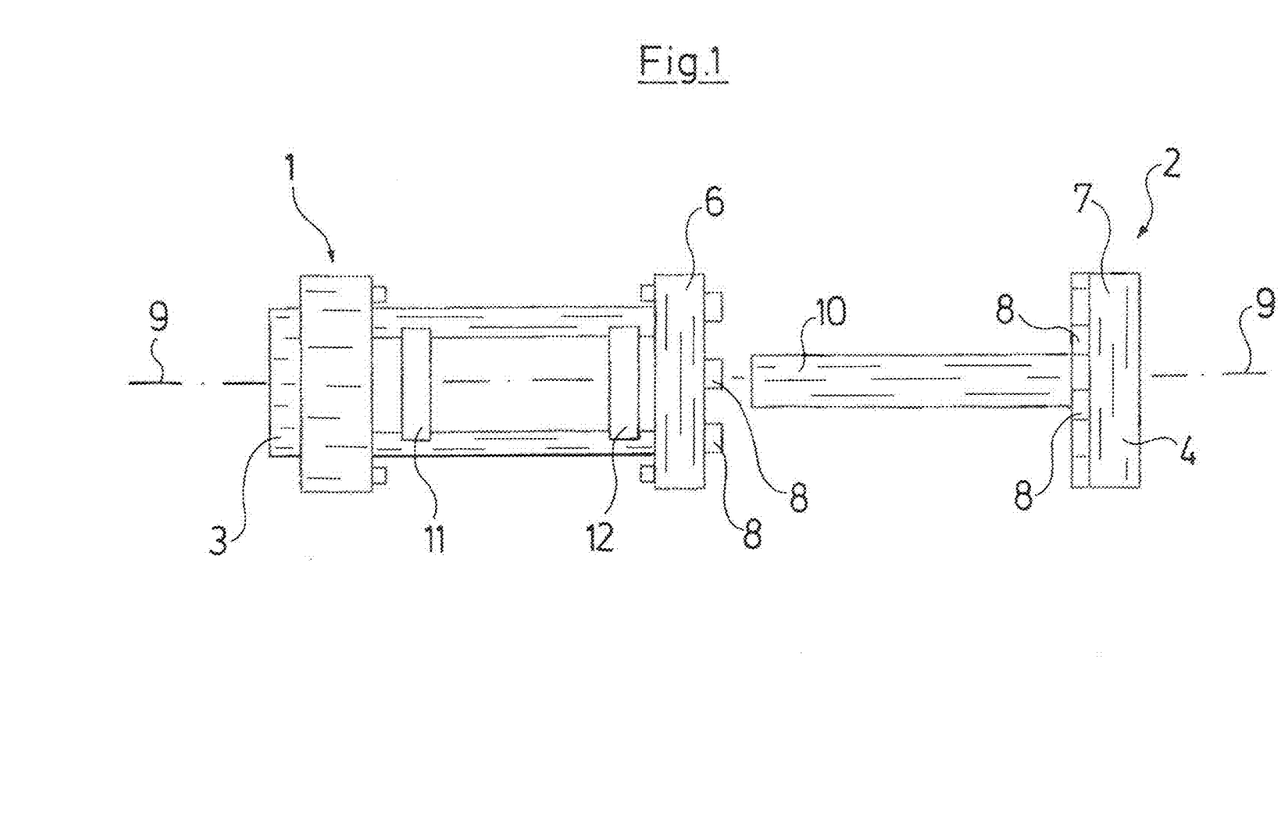
FIG. 1 is a highly simplified, diagrammatic view of the basic structural design of the coupling according to the invention comprised of two coupling parts.
Figure 2:
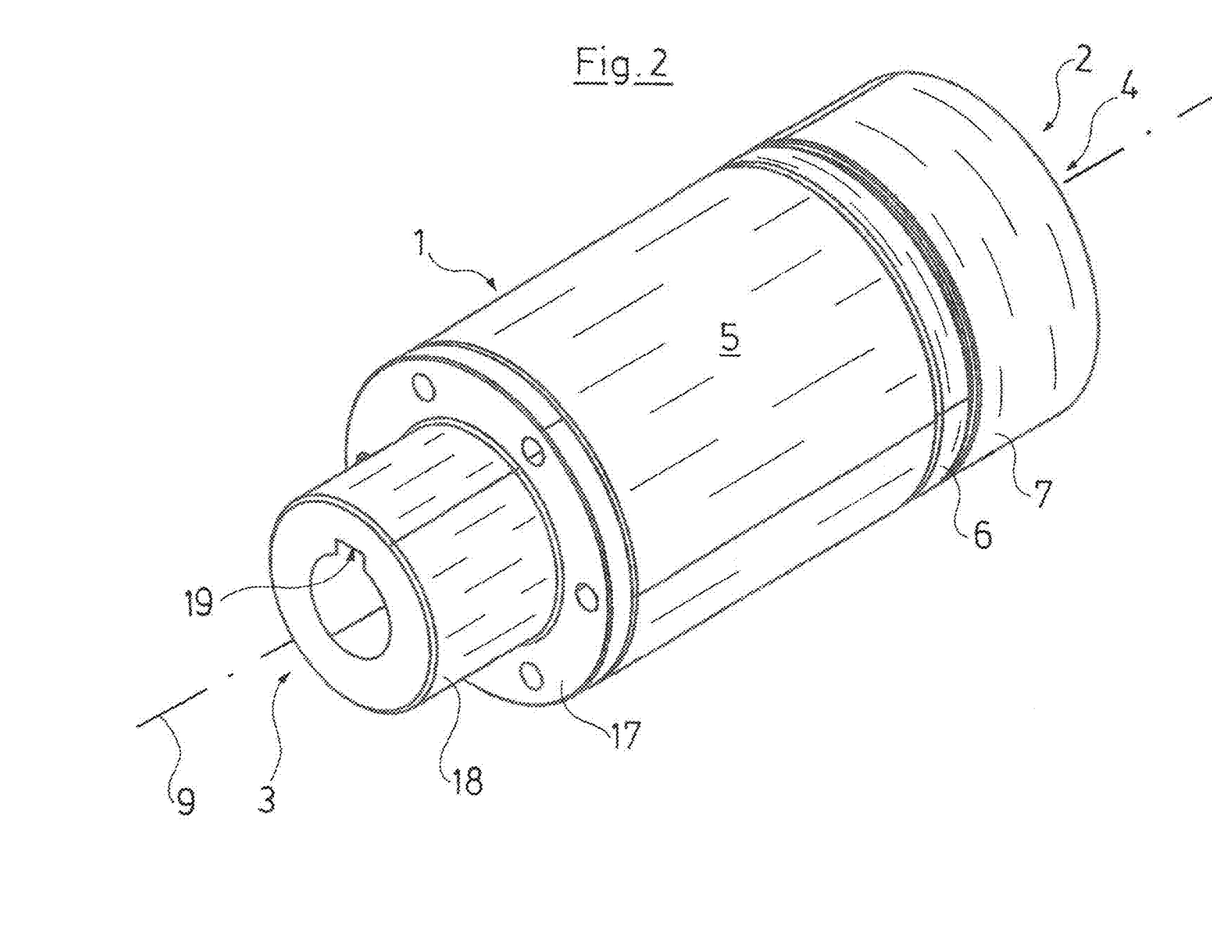
FIG. 2 is a perspective view of the coupling in an assembled state.
Figure 3:
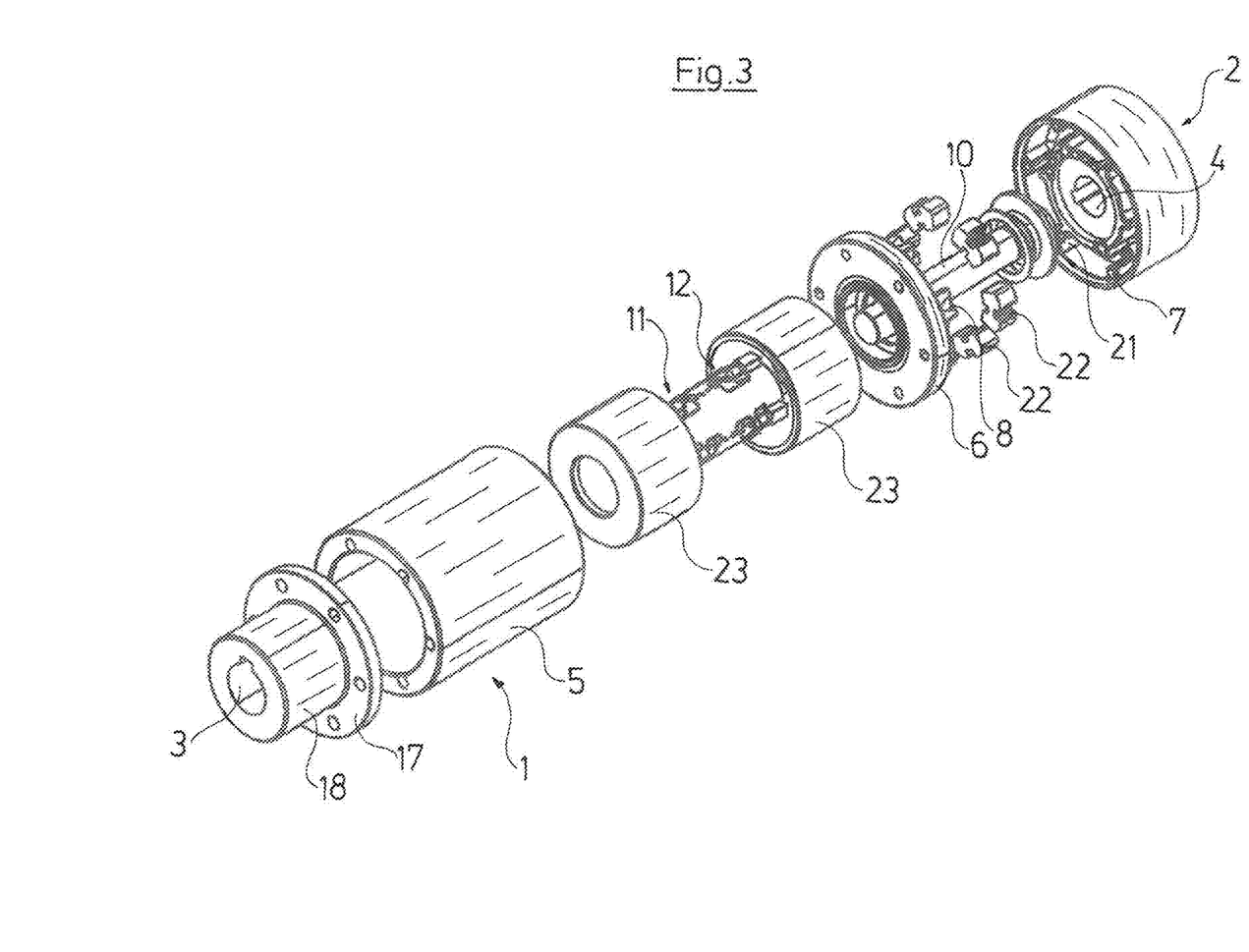
FIG. 3 is the coupling according to FIG. 2 in an exploded view.

The basic structural design of the coupling is shown based on FIG. 1. The coupling consists of a drive-side coupling part 1 and a driven-side coupling part 2. The free end of the drive-side coupling part 1 exhibits a terminal 3 for fixed connection, for example with the shaft of a drive motor. Correspondingly, the free end of the driven-side coupling part exhibits a terminal 4 for connection with a drive shaft, for example a centrifugal pump. Terminals 3 and 4 must here only be understood as examples, as the drive-side coupling part 1 can basically also be connected with an output shaft, and the driven-side coupling part 2 with a drive shaft.

The coupling part 1 is connected by a tubular body 5 with one part of a jaw clutch coupling 6, the other part 7 of which is formed on the driven-side coupling part 2, specifically in the region of terminal 4, but on the side opposite the latter. Part 6 of the jaw clutch coupling exhibits axially projecting jaws 8, which engage with clearance into the opposite part 7, so that while a torque transmission between parts 6 and 7 of the jaw clutch coupling is ensured on the one hand, both a radial displacement of parts 6 and 7, and hence coupling parts 1 and 2, relative to each other is possible on the other, along with an angular displacement, respectively in relation to the ideal longitudinal axis 9 of the coupling. When the jaws 8 of the coupling parts 6 and 7 mesh with each other, there can, within limits, be both an angular displacement as diagrammatically shown on FIG. 7c, as well as a radial displacement as shown on FIG. 7b, between the drive and output, i.e., between the terminals 3 and 4 or the coupling parts 1 and 2. The jaw clutch coupling is also able to absorb a combination of these alignment errors between the drive and output without influencing the main torque transmission. Of course, the coupling parts 1 and 2 are for this purpose axially telescoped, i.e., integrated one into the other, to a point where parts 6 and 7 of the jaw clutch coupling positively intermesh.

The side of the driven-side coupling part 2 facing away from the terminal 4 exhibits a rod-like body in the form of a cylindrical rod 10, which with the coupling in an assembled state extends over nearly the entire length of the coupling, and projects into the tubular body 5 of the drive-side coupling part 1 almost as far as the terminal 3.

Spaced axially apart from each other on the inner circumference inside the tubular body 5 are sensor groups 11 and 12, whose sensors 13-16 are uniformly distributed over the circumference, and determine the distance from the cylindrical rod 10.

When the drive-side coupling part 1 is connected with a drive motor and the driven-side coupling part 2 with a processing machine, e.g., a centrifugal pump, with the coupling in an assembled state, these sensor groups 11 and 12 spaced the same radial distance apart from the axis 9 in the neutral position of the coupling are used to ascertain the distance to the outer circumference of the cylindrical rod 10. Therefore, when the coupling comprised of coupling parts 1 and 2 turns around the axis 9 during operation, and the coupling parts 1 and 2 do not ideally align, as depicted on FIG. 1 and FIG. 7a, but there exists a radial displacement as depicted on FIG. 7b, and/or there exists an angular displacement, as depicted based on FIG. 7c, the distances between the sensors 13-16 and cylindrical rod 10 also change during the rotation. These tolerances are balanced out inside the coupling, but also acquired by the sensor groups 11 and 12, since this results in a change in the identical distance that exists given aligned axes between the cylindrical rod 10 and tubular body 5 or sensors of the sensor groups 11 and 12 situated there.

Figure 6:
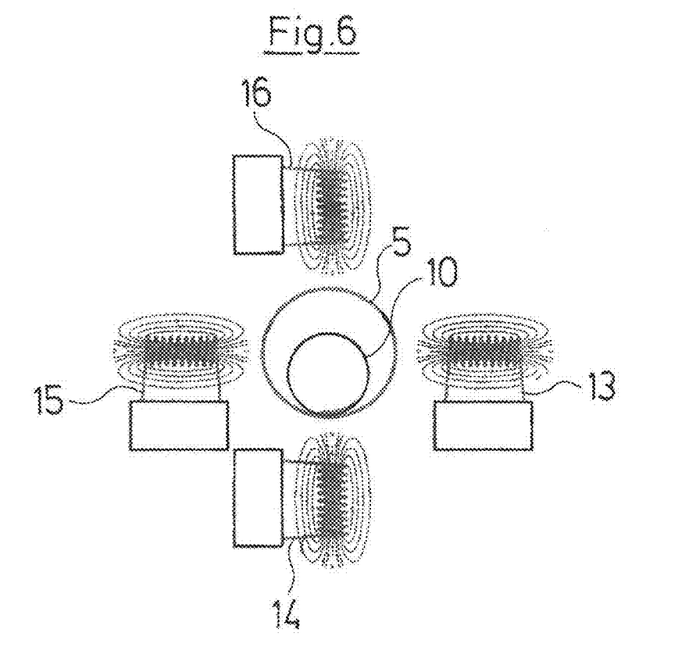
FIG. 6 is a cross sectional view of the arrangement of a sensor group.

FIG. 6 shows how a sensor group 11 or 12 is put together. In the embodiment depicted, a sensor group 11, 12 consists of four eddy current sensors 13, 14, 15 and 16 arranged in a plane transverse to the axis 9, which at a respective distance of 90° relative to the longitudinal axis 9 are arranged symmetrically around the latter on the tubular body 5. As illustrated on FIG. 6, the distance between the cylindrical rod 10 and tubular body 5 that potentially changes during rotation of the coupling can be determined with a group of sensors 13-16, but these data cannot be used to determine whether a radial displacement s or angular displacement a is here involved. For this purpose, information about the latter must be gleaned by performing the measurement in two sensor groups 11 and 12 spaced axially apart from each other. It is basically required that at least two angularly offset sensors 13-16 be arranged in each sensor group 11, 12. However, arranging four sensors 13-16 at an angular distance of 90° as shown on FIG. 6 has proven effective.

The arrangement of four sensors 13-16 in two groups as described above enables an especially simple and at once precise measured value acquisition, specifically when two opposing sensors 13 and 15 or 14 and 16 are interconnected in such a way that their signal is added. Since the changes in distance between the cylindrical rod 10 and tubular body 5 are always identical on both sides, a high measuring accuracy is thus achieved given a suitable interconnection of opposing sensors. In addition, a sensor failure or defect is immediately detectable.

Since the tubular body 5 and cylindrical rod 10 are situated in a torque-proof manner to each other as the coupling rotates, i.e., while the coupling transmits the torque from the drive to the output, an additional sensor or rotary encoder can be provided if needed to acquire the rotational position of the coupling or its rotational speed, but the latter are not shown in detail on the figures.

Figure 7A:
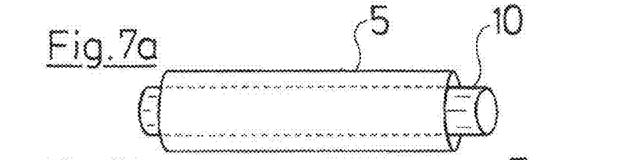
FIG. 7a is a view of a first possible arrangement of the coupling parts relative to each other.
Figure 7B:
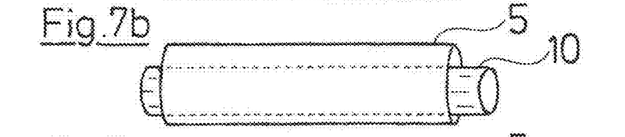
FIG. 7b is a view of a second possible arrangement of the coupling parts relative to each other.
Figure 7C:
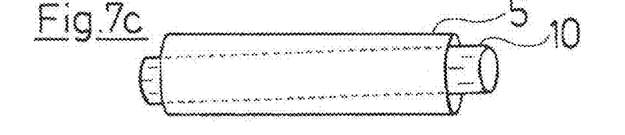
FIG. 7c is a view of a third possible arrangement of the coupling parts relative to each other.

FIGS. 1, 6 and 7 depict and explain the basic structural design of the coupling. FIG. 2-5 show the construction of a coupling put together in this way.

In the construction shown, the drive-side coupling part 1 exhibits a flange 17, which is fixedly connected with a hollow cylindrical section 18, whose interior side exhibits a longitudinal groove 19, and which forms the terminal 3 for connecting a drive shaft with a wedge, which lies in a corresponding recess on the outer circumference of the shaft, as well as inside the longitudinal groove 19, so as to positively join the components with each other in the rotational direction around the axis 9. Of course, a serration or some other suitable shaft hub connection is here also possible in place of the depicted spline shaft connection.

The terminal 3 is joined by way of the flange 17 with the tubular body 5, which has a hollow cylindrical design, and serves to transmit torque between the terminal 3 and part 6 of the jaw clutch coupling, which is flanged to the other end of the tubular body 5. This part 6 of the jaw clutch coupling 6 exhibits jaws 8 that project in the opposite direction from the flange 17 provided for connection with the tubular body 5, which serve to transmit the torque to part 7 of the jaw clutch coupling.

Figure 4:
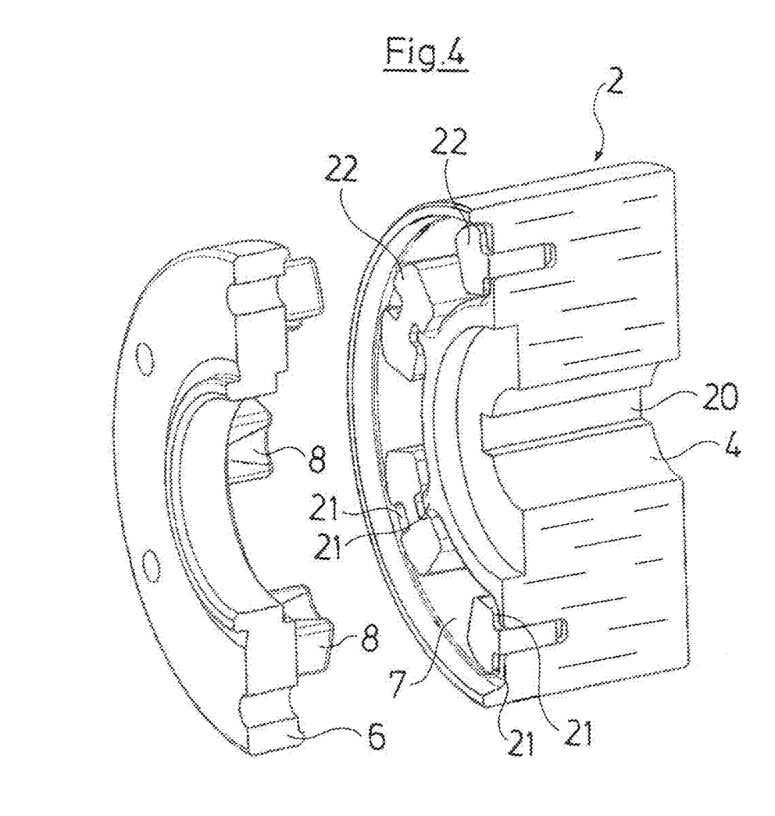
FIG. 4 is a perspective view of a longitudinal section through a section of the coupling.
Figure 5:
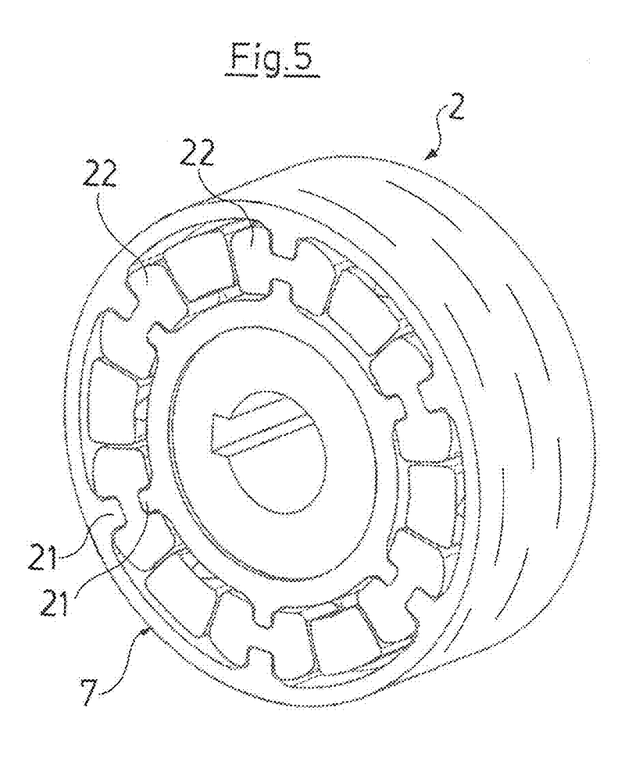
FIG. 5 is a perspective view of a cross section of the coupling in the region in which the torque is transmitted.

The structural design of the jaw clutch coupling may be gleaned from FIG. 4-5. The driven-side coupling part 2 exhibits an essentially hollow cylindrical shape, and its interior side also has a longitudinal groove 20, so that the terminal 4 for the driven-side shaft is designed identically to the terminal 3 for the drive-side shaft. Therefore, the coupling can be situated however desired between the drive and output shaft. Part 7 of the jaw clutch coupling is integrated in the driven-side coupling part 2. To this end, an annular groove is recessed into the hollow cylindrical part, and its bordering walls exhibit respectively paired, radial projections 21, which serve to accommodate mold elements 22 with roughly a double-T shaped cross section, which consist of a damping material, here hard rubber, and are used to establish a positive connection between the projections 21 on the one hand and the jaws 8 of part 6 of the jaw clutch coupling that engage between adjacent positive-fit elements 22 on the other. This configuration ensures that torque is transmitted between the drive-side coupling part 1 and driven-side coupling part 2, but enough clearance exists in the area of the jaw clutch coupling to supply both a radial displacement and angular displacement between the parts 6 and 7 of the jaw clutch coupling, and hence between the drive-side coupling part 1 and driven-side coupling part 2.

Since the borehole forming the terminal 4 is designed continuously with the groove 20, it is not provided just for connecting the output shaft, but also for attaching the cylindrical rod 10 having a correspondingly designed end toward the interior of the coupling.

Fixedly arranged inside the tubular body 5 is a hollow cylindrical interior housing 23, which carries the two sensor groups 11 and 12 each consisting of sensors 13-16 with an axial distance. As a consequence, the sensors are protected in a closed plastic housing, while the remaining coupling components consist of metal. Also integrated inside this interior housing 23 is the electronic evaluation unit (not shown here in any detail) along with a transmitter that transfers data. Since the coupling is provided for measuring displacement during operation, the energy required for operating the electronics is generated via the rotation of the coupling itself, the advantage to which especially at higher speeds is that no imbalance—generating battery must be built in. The energy can here be generated inductively by setting up magnets and coils, or alternatively piezoelectrically by transmitting the oscillations that arise during rotation to a piezoelectric crystal, causing it to produce energy.

While specific embodiments of the invention have been shown and described in detail to illustrate the application of the principles of the invention, it will be understood that the invention may be embodied otherwise without departing from such principles.

The invention claimed is:

1. A coupling comprising:
a drive-side coupling part;
a driven-side coupling part, the drive-side coupling part and the driven-side coupling part being connected to one another in a limitedly movable and torque-transmitting manner;
a hollow body; and
a sensor means, wherein one of the drive-side coupling part or the driven-side coupling part comprises a rod body which is fixedly connected thereto, extends in the direction of a rotation axis of the coupling and is surrounded by the hollow body fixedly connected to the other coupling part, wherein the sensor means detects a radial distance between the rod body and the hollow body during rotation of the coupling, wherein the sensor means detects the radial distance between the rod body and the hollow body, at at least two axially distanced locations.

2. A coupling according to claim 1, wherein the sensing means comprises sensors arranged about the rotation axis to define a circumferential arrangement of sensors.

3. A coupling according to claim 1, wherein the sensor means comprise two axially distanced groups of distance sensors.

4. A coupling according to claim 3, wherein a group of distance sensors comprises at least two distance sensors which are arranged angularly offset to one another with respect to the rotation axis.

5. A coupling according to claim 3, wherein a group of distance sensors comprises three or more distance sensors which are arranged distributed at an equal angular distance, about the rotation axis.

6. A coupling according to claim 3, wherein the distance sensors comprise eddy current sensors.

7. A coupling according to claim 3, wherein the distance sensors are arranged at the hollow body.

8. A coupling comprising:
a drive-side coupling part;
a driven-side coupling part, the drive-side coupling part and the driven-side coupling part being connected to one another in a limitedly movable and torque-transmitting manner, one of the drive-side coupling part and the driven-side coupling part comprising a rod body fixedly connected thereto, the rod body extending parallel to a longitudinal axis of the drive-side coupling part, another one of the drive-side coupling part and the driven-side coupling part comprising a hollow body fixedly connected thereto, the hollow body being located radially opposite at least a portion of the rod body with respect to the longitudinal axis;
a first sensor; and
a second sensor located at an axially spaced location from said first sensor with respect to the longitudinal axis of the drive-side coupling part, wherein the first sensor detects at least a first radial distance between a first area of the rod body and the hollow body during rotation of the coupling and the second sensor detects at least a second radial distance between a second area of the rod body and the hollow body during rotation of the coupling.

9. A coupling in accordance with claim 8, further comprising:
a third sensor, at least the first sensor and the third sensor defining a first group of sensors, the third sensor being arranged opposite a third area of the rod body and the hollow body;
a fourth sensor, at least the second sensor and the fourth sensor defining a second group of sensors, the fourth sensor being arranged opposite a fourth area of the rod body and the hollow body.

10. A coupling in accordance with claim 9, wherein the first sensor is located at a circumferentially spaced location from the third sensor with respect to the longitudinal axis, the fourth sensor being located at a circumferentially spaced location from the second sensor with respect to the longitudinal axis.

11. A coupling in accordance with claim 9, wherein the third sensor is located at an axially spaced location from the fourth sensor with respect to the longitudinal axis.

12. A coupling comprising:
a drive-side coupling part;
a driven-side coupling part, the drive-side coupling part and the driven-side coupling part being connected to one another in a limitedly movable and torque-transmitting manner, one of the drive-side coupling part and the driven-side coupling part comprising a rod body fixedly connected thereto, the rod body extending parallel to a longitudinal axis of the drive-side coupling part, another one of the drive-side coupling part and the driven-side coupling part comprising a hollow body fixedly connected thereto, the hollow body being located radially opposite at least a portion of the rod body with respect to the longitudinal axis, the rod body comprising a first rod body area and a second rod body area, the first rod body area being located at an axially spaced location from the second rod body area with respect to the longitudinal axis, the hollow body comprising a first hollow body area and a second hollow body area, the first hollow body area being located at an axially spaced location from the second hollow body area with respect to the longitudinal axis, the first hollow body area being located radially opposite the first rod body area with respect to the longitudinal axis, the second hollow body area being located radially opposite the second rod body area with respect to the longitudinal axis;
a first sensor located opposite the first rod body area and the first hollow body area, the first sensor detecting at least a first radial distance between the first rod body area and the first hollow body area during rotation of the coupling; and
a second sensor located at an axially spaced location from said first sensor with respect to the longitudinal axis of the drive-side coupling part, the second sensor being located opposite the second rod body area and the second hollow body area, the second sensor detecting at least a second radial distance between the second rod body area and the second hollow body area during rotation of the coupling.

13. A coupling in accordance with claim 12, further comprising:
a third sensor, at least the first sensor and the third sensor defining a first group of sensors, the rod body comprising a third rod body area and a fourth rod body area, the hollow body comprising a third hollow body area and a fourth rod body area, the third rod body area being located radially opposite the third hollow body area with respect to the longitudinal axis, the third sensor being located opposite the third rod body area and the third hollow body area;
a fourth sensor, at least the second sensor and the fourth sensor defining a second group of sensors, the fourth rod body area being located radially opposite the fourth hollow body area with respect to the longitudinal axis, the fourth sensor being located opposite the fourth rod body area and the fourth hollow body area.

14. A coupling in accordance with claim 13, wherein the first sensor is located at a circumferentially spaced location from the third sensor with respect to the longitudinal axis, the fourth sensor being located at a circumferentially spaced location from the second sensor with respect to the longitudinal axis.

15. A coupling in accordance with claim 13, wherein the third sensor is located at an axially spaced location from the fourth sensor with respect to the longitudinal axis.

16. A coupling in accordance with claim 13, wherein the third rod body area is located an axially spaced location from the fourth rod body area with respect to the longitudinal axis, the third hollow body area being located at an axially spaced location from the fourth hollow body area with respect to the longitudinal axis.

* * * * *